United States Patent [19]
Colibert

[11] Patent Number: 5,277,448
[45] Date of Patent: Jan. 11, 1994

[54] CONCEALED VERTICAL HITCH RECEIVER

[76] Inventor: Floyd A. Colibert, 2995 W. 6620 South, West Jordan, Utah 84084

[21] Appl. No.: 60,305

[22] Filed: May 10, 1993

[51] Int. Cl.⁵ .............................................. B60D 1/52
[52] U.S. Cl. ................................. 280/495; 280/491.5
[58] Field of Search ............ 280/495, 496, 497, 415.1, 280/491.5, 491.1

[56] References Cited

U.S. PATENT DOCUMENTS

| | | | |
|---|---|---|---|
| 2,889,155 | 6/1959 | Sandage | 280/495 |
| 2,978,260 | 4/1961 | Hebeisen | 280/491.5 |
| 3,271,050 | 9/1966 | Saunders | 280/507 |
| 4,032,170 | 6/1977 | Wood | 280/495 |
| 4,202,562 | 5/1980 | Sorenson | 280/415.1 |
| 4,266,799 | 5/1981 | Wood | 280/495 |
| 4,280,713 | 7/1981 | Bruhn | 280/415.1 |
| 4,610,458 | 9/1986 | Garnham | 280/495 |
| 4,738,464 | 4/1988 | Putnam | 280/500 |
| 5,102,156 | 4/1992 | Fink et al. | 280/495 |

FOREIGN PATENT DOCUMENTS 1431886 2/1966 France ........................ 280/495

Primary Examiner—Margaret A. Focarino
Assistant Examiner—Kevin Hurley
Attorney, Agent, or Firm—Thorpe, North & Western

[57] ABSTRACT

A concealed trailer hitch device for a vehicle or truck comprises a first hitch interconnect member permanently and rigidly fixed to a frame of the vehicle. The first hitch interconnect member has a coupling member integrally formed as one of its parts which is in a downward orientation and is at least partially concealed under the vehicle. The hitch device includes a second hitch interconnect member of singular construction which has (i) a first end configured for insertion onto the coupling member of the first interconnect member along the downward orientation and (ii) a receiver end configured with a hitch receiver socket as a remaining end which is in approximate horizontal orientation when the second hitch is coupled at the first interconnect member. A locking pin is provided for releasably retaining the second hitch interconnect member coupled at the first hitch interconnect member.

12 Claims, 3 Drawing Sheets

CONCEALED VERTICAL HITCH RECEIVER

BACKGROUND OF THE INVENTION

1. Field of the Invention

This invention pertains to a trailer hitch device which can be attached to the frame of a truck, forward of the rear bumper, but concealed from view until placed in actual use.

2. Prior Art

With the ever increasing interest in recreational and all-terrain vehicles, trailer hitch devices continue to expand in versatility and application. With the advent of short bed truck designs, bumper configurations have introduced unique requirements because of the limited amount of space under the truck bed. For example, many short bed trucks have a rear bumper which conceals a spare tire storage area under the bed of the truck. The position of the spare tire mount and close proximity of the bumper or roll pan, create substantial difficulty for attachment of a trailer hitch. Specifically, there is not a convenient access to connect a hitch frame to the frame of the truck. Consequently, the conventional location for attachment comprises the rear bumper.

Prior art attachment devices coupling the hitch directly to the bumper have usually become a permanent part of the bumper structure. Unfortunately, this bumper hitch is typically in plain view. The presence of an exposed trailer hitch on the bumper of a short bed sport truck is not favorable where such trucks have been expressly designed to have a sport car appearance. Accordingly, many owners of short bed sport trucks decline use of a trailer hitch.

Some prior art variations of hitch designs offer optional attachment configurations from the more conventional hitch structures. U.S. Pat. No. 3,271,050 teaches that the exposed hitch opening can be concealed by an insert which also offers some functional utility for minimizing damage when the lower, hitch structure scraps a road surface. U.S. Pat. No. 4,738,464 discloses a different approach to attachment of a hitch to a truck frame, by segmenting the bumper and providing for an insert for the license plate which is actually part of the hitch frame. Finally, U.S. Pat. No. 4,280,713 identifies an elbow structure which enables the attachment of a hitch member that allows use of two hitch balls of differing sizes. This elbow member does not, however, teach ready attachment to the underside of a truck frame in a concealed manner. Instead, the hitch is attached to the bumper itself.

OBJECTS AND SUMMARY OF THE INVENTION

It is an object of the present invention to provide a trailer hitch that can be permanently attached below the bed of the truck despite limited space for attachment to the truck frame.

It is a further object of this invention to provide such a trailer hitch that is concealed below the truck bed and behind the rear or roll pan bumper of the vehicle.

It is yet another object of the present invention to provide a trailer hitch which can be separated into components which may be left in place in an exposed, useful position, or removed so that the truck has no apparent hitch assembly.

These and other objects are realized in a concealed trailer hitch device for a tow vehicle comprising a first hitch receiver fixed to a rear frame member of the vehicle which has a first hitch socket in approximate vertical orientation. The receiver has a first socket opening oriented downward which is at least partially concealed behind a rear bumper or roll pan and under the vehicle. A second hitch receiver includes (i) a male end configured for positioning within the first socket of the first hitch receiver and (ii) a second hitch socket in approximate horizontal orientation when positioned within the first hitch receiver. The second hitch socket includes a second socket opening oriented rearward and configured to receive a standard hitch mount with hitch ball or other hitch interlock member. Locking means is provided for releasably retaining the second hitch receiver in the first hitch receiver.

A further aspect of this invention comprises steps of a method for attaching a trailer hitch to a truck frame below a vehicle bed and forward of a rear bumper in concealed position. This method comprises the steps of a) selecting a first hitch receiver having a first hitch socket capable of being attached to the truck in approximate vertical orientation, the receiver having a first socket opening; b) affixing the first hitch receiver to a rear frame member of the vehicle, concealed below the truck or vehicle bed in a position forward of the bumper and which places the first socket opening in a downward orientation; c) positioning a second hitch socket in approximate horizontal orientation below the rear bumper by inserting a male end of a second hitch receiver within the first hitch socket of the first hitch receiver, the second hitch socket including a second socket opening oriented rearward and configured to receive a standard hitch mount with hitch ball; and d) releasably locking the second hitch receiver in the first hitch receiver.

Other objects and features of the present invention will be apparent to those skilled in the art, based on the following detailed description, taken with the accompanying drawings.

DETAILED DESCRIPTION OF THE INVENTION

Figure 1:
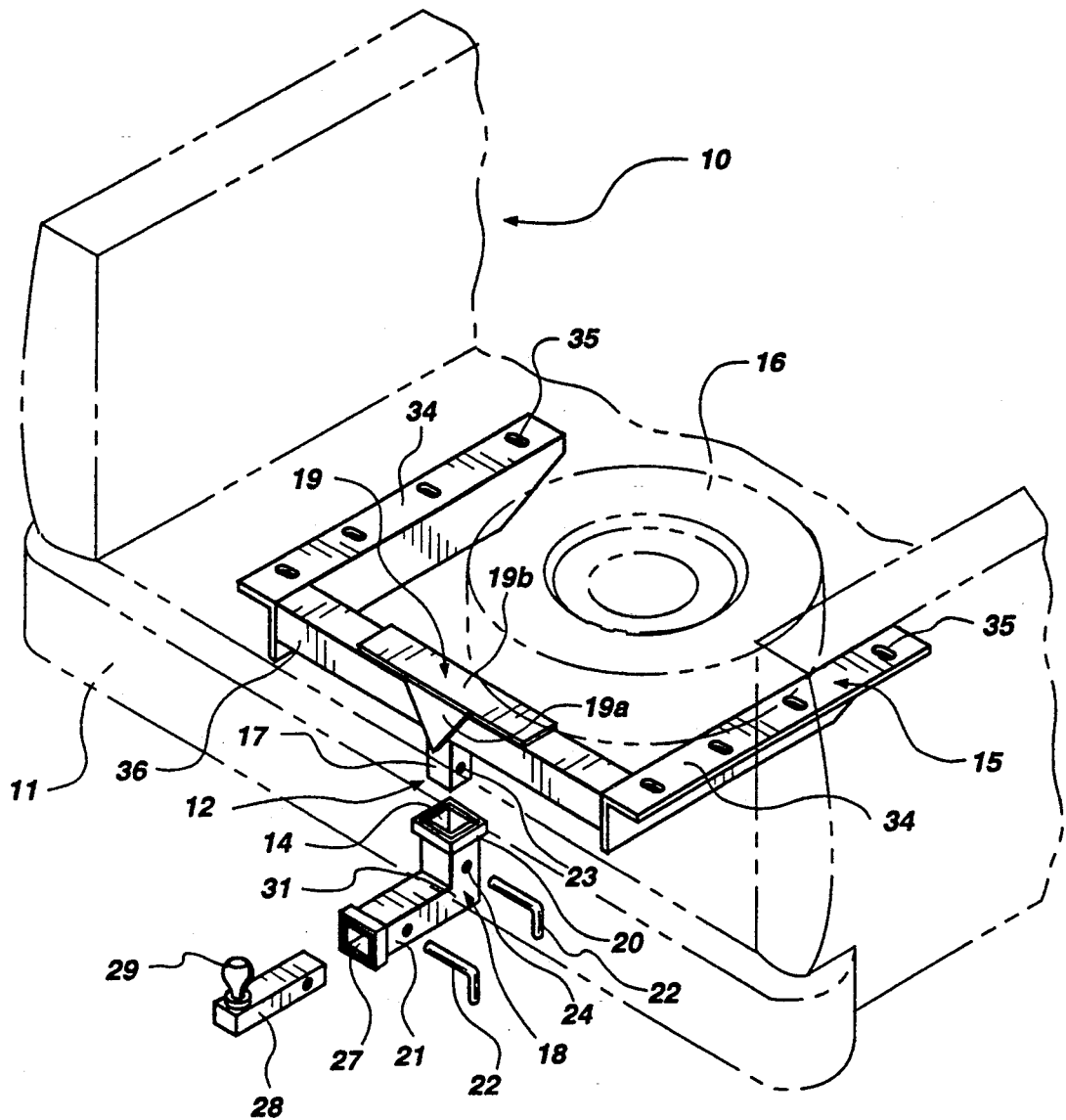
FIG. 1 shows a perspective view of the present hitch invention, with the truck bed section of a vehicle shown in phantom line representation.
Figure 2:
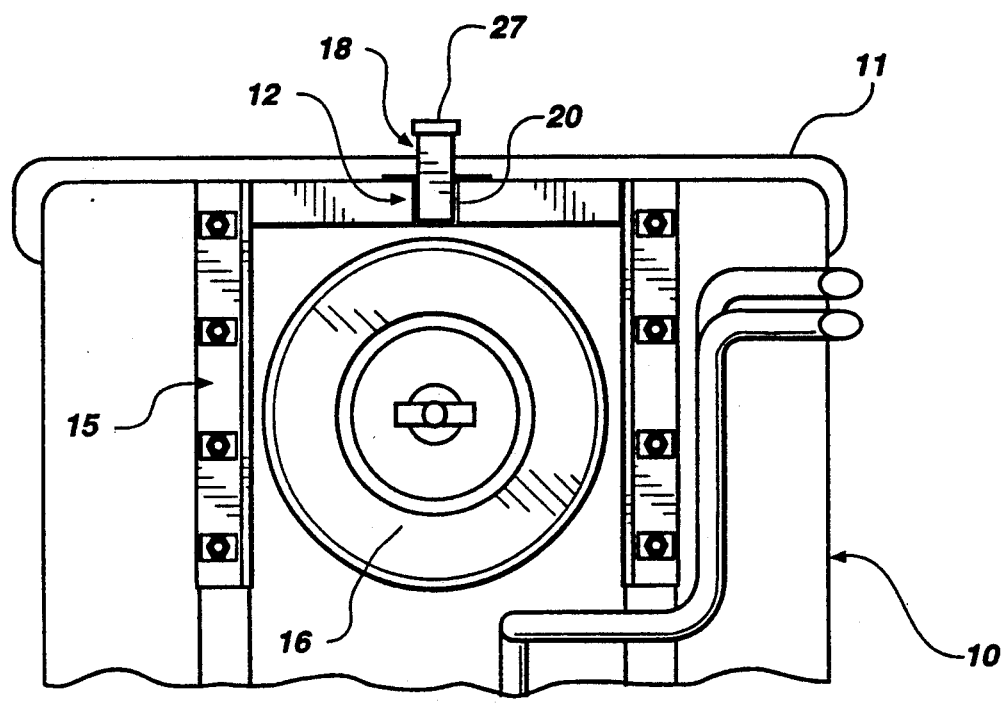
FIG. 2 represents a bottom, perspective view of the vehicle of FIG. 1, with the hitch device installed.
Figure 3:
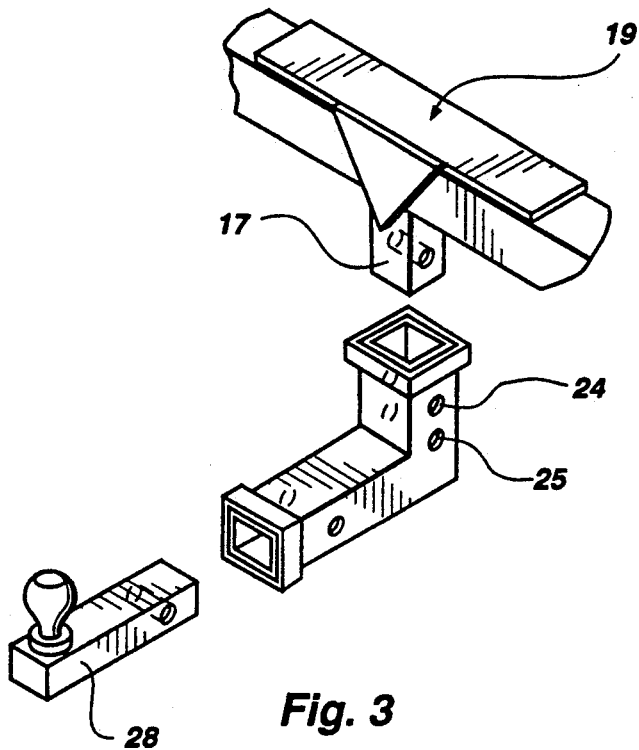
FIG. 3 graphically illustrates an exploded view of the components of the hitch device.
Figure 4:
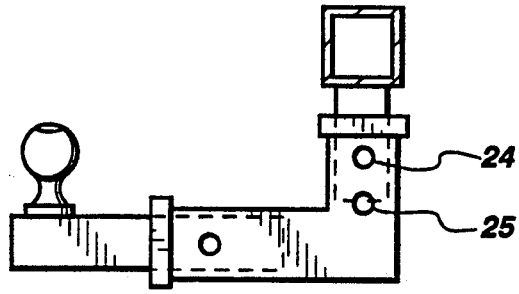
FIG. 4 is a side, elevational view of the present invention in assembled configuration.

FIG. 1 shows a truck 10 which exemplifies current short bed designs. It should be noted that the purpose of this truck design is to provide a clean, sport look to a truck with a short bed length. Although the present invention can be applied to other truck structures, it is particularly suited to the short bed vehicle because it does not attach the hitch device in an exposed manner. In addition, it allows attachment to the frame of the truck or vehicle, even with very limited space under the truck bed.

The interconnection between the truck or vehicle frame and the hitch invention 12 as disclosed herein comprises a rectangular frame 15 which can be welded or otherwise secured to the truck frame under the roll pan or bumper 11. The rectangular shape of this hitch frame allows the attachment around a spare tire mount 16 which is typically positioned under the bed of a truck. It will be apparent to those skilled in the art that other shapes for the hitch frame 15 may be configured to meet space limitation requirements of vehicles of different design.

Attached to the hitch frame 15 is a first hitch interconnect member 17 having an approximate vertical orientation. In the illustrated embodiment, the interconnect member 17 comprises a rectangular insert or male member which can be received into a receiver 18 having a first socket opening 14 oriented upward. It will be apparent to those skilled in the art that a reverse configuration of socket and insert could be applied. In other words, the interconnect member 17 could comprise a receiver or socket and the receiver 18 could be a corresponding male member.

Figure 5:
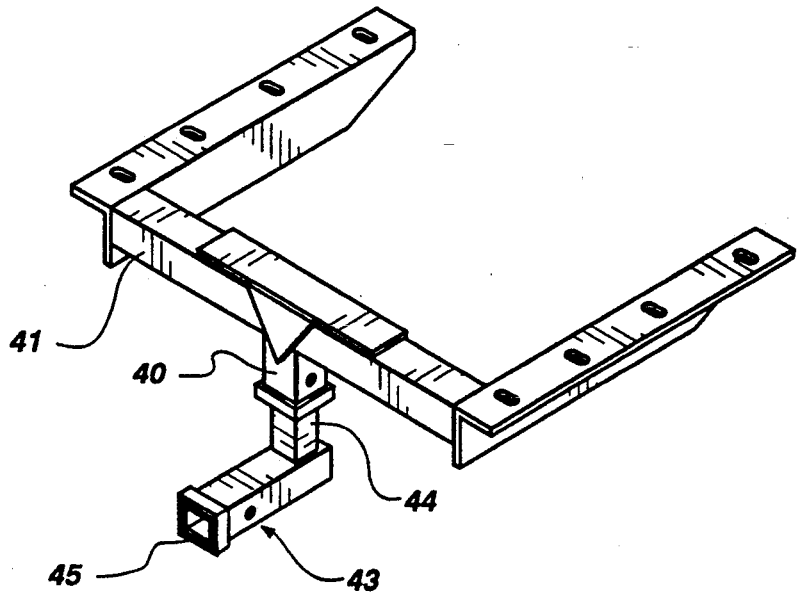
FIG. 5 is a perspective view of the assembled hitch separated from the truck.

This embodiment is shown in FIG. 5, which is actually the preferred configuration for strength. It also adopts the traditional practice of having the receiver 40 mounted to the truck, with the insert 44 being the removable portion. Although either configuration will work equally well, the remaining discussion will present the illustrated embodiment wherein the interconnect member 17 attached to the hitch frame 15 is an insert or male member.

The hitch frame 15 is formed as a single, integral unit which is welded together from square, tubular steel and opposing angle irons. The tubular section 36 is a 2 and ½ inch outer diameter tube with ¼ inch wall thickness. It is welded at its ends to a pair of angle irons 34, which include openings 35 for bolting the unit to the truck frame. The width of the hitch frame 15 is equal to the vehicle frame.

The attachment of the interconnect member 17 includes a collar reinforcement 19 to ensure adequate strength at this primary load bearing junction. This reinforcement 19 includes a triangular plate 19a which is welded across the juncture of the interconnect member 17 and the tube 36. The top of the tube 36 is reinforced with the rectangular plate 19b which is welded in the top position as shown.

The interconnect member 17 comprises a solid steel section which is welded at one end to the hitch frame and collar, and projects downward to form a vertical coupling for removable attachment of the receiver 18, which constitutes the second component of the hitch assembly. In FIG. 5, this interconnect member 40 comprises the receiver as previously described.

The second component of the hitch assembly comprises a hitch receiver having (i) a second interconnect member 20 configured for coupling with the first interconnect member 17 in a downward, and preferably vertical orientation and (ii) a second receiver or hitch socket 21 in approximate horizontal orientation when coupled at the first interconnect member. The disclosed embodiment has a cross-section for the second receiver which is slightly larger than the cross-section of the interconnect member such that the first interconnect member telescopically slides into the second interconnect member. A locking pin 22 is provided and locates within aligned openings 23 and 24 of the first and second interconnect members. This locking pin enables the separation of the hitch receiver from the hitch frame when the hitch is not needed. Consequently, the hitch frame is not visible, preserving the normal appearance of the vehicle.

The length of the first and second interconnect members 17 and 18 will depend on the desired height of the hitch coupling or ball from the ground. As can be seen from the drawings, the elevation of the second receiver 21 will be a product of the length of the first and second insert members, and their point of coupling by the locking pin 22. By providing additional aligned openings 25, height adjustment is possible by selectively interconnecting the two members 17 and 18 at the desired elevation.

The second receiver 21 or hitch socket includes a second socket opening 27 oriented rearward and configured to receive a standard hitch mount 28 with hitch ball 29 or other coupling device. This portion of the hitch assembly is similar to conventional hitch construction and needs no further discussion. Locking means 22, 23 and 24 for releasably retaining the second hitch receiver with the inserted hitch mount 28 is provided. This consists of the locking pin 22 and aligned openings 23 and 24.

It should be noted that other configurations may be applied to the second interconnect member 18, in addition to the right angle connection between the first end and the second hitch sockets. For example, an oblique or arcuate shape could be utilized, as long as the second receiver 21 was substantially horizontal to allow conventional insertion of the hitch mount 28. In this instance, the elbow 31 between the first and second hitch sockets 14 and 27 would form an oblique angle or arc, rather than the illustrated 90 degree bend.

In the reverse embodiment of FIG. 5, the first interconnect member is shown as a first hitch receiver 40 attached to the hitch frame 41 in approximate vertical orientation. The receiver 40 includes a first socket opening oriented downward when attached to the vehicle and is capable of at least partial concealment behind a rear bumper or roll pan and under the vehicle. A second hitch receiver 43 includes (i) a male end 44 configured for positioning within the opening of the first hitch receiver and (ii) a second receiver 45 and opening in approximate horizontal orientation when positioned within the first hitch receiver. The second hitch receiver and opening are oriented rearward and configured to receive a standard hitch mount with hitch ball or other coupling means.

These various structures enable use of a method for attaching a trailer hitch to a vehicle below a vehicle bed and behind a rear bumper or body in concealed position in accordance with the following steps. First, the user selects a first hitch interconnect member 17 or 40 having a first hitch insert or socket configuration, depending upon the mating configuration of the second interconnect member 18 or 43. This first interconnect member needs to be capable of being attached to the vehicle such that the second receiver 21 or 45 is substantially horizontal and capable of receiving a standard hitch mount 28. The next step is to affix the first hitch interconnect member to a rear frame member of the vehicle, such as by means of the hitch frame 15, which is welded below the truck bed in a position behind the bumper. This provides for at least partially concealment behind the rear bumper and under the vehicle. The user then positions a second hitch interconnect member 18 or 43 on the first interconnect member 17 or 40, with the second receiver 21 or 43 in approximate horizontal orientation below the rear bumper or roll pan. A pin or other locking means 22 is releasably connected between the first and second interconnect members, providing a hitch receiver 45 which is ready for use. Weight tests on this unit have demonstrated a load bearing capacity of 5000 lbs gross trailer weight with a conventional non-weight-distributing hitch.

It will be apparent to those skilled in the art that the specific examples and embodiments provided in this disclosure are by way of example, and are not to be considered limiting, except as set forth in the following claims.

I claim:

1. A concealed trailer hitch device for a tow vehicle comprising:
    a first hitch interconnect member permanently and rigidly fixed to a rear frame of the vehicle and having a coupling member integrally formed as part of the first hitch interconnect member in a downward orientation;
    a second hitch interconnect member of singular construction having (i) a first end configured for insertion onto the coupling member of the first interconnect member along the downward orientation and (ii) a receiver end configured with a hitch receiver socket as a remaining end which is in approximate horizontal orientation when the second hitch interconnect member is coupled at the first interconnect member, said first end and receiver end being in nonparallel relationship; and
    locking means for releasably retaining the second hitch interconnect member coupled at the first hitch interconnect member.

2. A device as defined in claim 1, wherein the second hitch interconnect member is structured with a right angle connection between respective ends of the second hitch interconnect member.

3. A device as defined in claim 1, wherein the second hitch interconnect member is formed with an elbow between the ends of the second hitch interconnect member.

4. A device as defined in claim 1, wherein the first interconnect member includes a rear frame member which is anchored to the rear frame of the vehicle in a position surrounding a spare tire or fuel tank.

5. A device as defined in claim 1, wherein the first interconnect member comprises a first receiver socket as the coupling member and the first end of the second hitch interconnect member comprises an insert end configured for insertion within the first receiver socket.

6. A device as defined in claim 1, wherein the first end of the second interconnect member comprises a first receiver socket and the first interconnect member includes an insert end configured for insertion within the first receiver socket.

7. A trailer hitch device adapted for use on a towing vehicle, said device comprising:
    a first hitch interconnect member including means for attachment to a frame member of the towing vehicle and having a first socket receiver in approximate downward orientation, said receiver having a first socket opening oriented downward when attached to the frame member and being capable of at least partial concealment under the vehicle;
    a second hitch receiver having (i) a male end configured for positioning within the first socket of the first hitch receiver and (ii) a second hitch socket in approximate horizontal orientation when positioned within the first hitch receiver, said second hitch socket including a second socket opening oriented outward from the vehicle and configured to receive a standard hitch mount with hitch coupling; and
    locking means for releasably retaining the second hitch receiver in the first hitch receiver.

8. A device as defined in claim 7, wherein the second receiver is oriented downward and is structured with a right angle connection between the male end and the second hitch socket.

9. A device as defined in claim 7, wherein the second receiver is formed with an elbow between the male end and the second hitch socket.

10. A device as defined in claim 7, wherein the first hitch interconnect member includes frame member which is adapted for anchoring under the vehicle to the vehicle frame in a position surrounding a spare tire or fuel tank.

11. A method for attaching a trailer hitch under a vehicle in concealed position, said method comprising the steps of:
    a) selecting a first hitch interconnect member capable of mating attachment to a second hitch interconnect member wherein the attachment places the first hitch interconnect member in a downward orientation and the second interconnect member in a horizontal orientation;
    b) rigidly affixing the first hitch interconnect member to a vehicle frame member in a position which is at least partially concealed under the vehicle;
    c) selecting a second hitch interconnect member having a hitch receiver at one end and mating structure at the other end adapted for coupling with the first interconnect member;
    d) positioning the second hitch interconnect member on the first hitch interconnect member with the hitch receiver in approximate horizontal orientation under the vehicle and oriented outward with respect thereto and configured to receive a standard hitch mount with hitch ball coupling; and
    e) releasably locking the second hitch receiver in the first hitch receiver.

12. A method as defined in claim 11, wherein the positioning step comprises vertically inserting the mating structure of the second hitch interconnect member onto the first hitch interconnect member, and concurrently maintaining the hitch receiver in the horizontal orientation.

* * * * *